United States Patent [19]
Lee et al.

[11] Patent Number: 5,734,599
[45] Date of Patent: *Mar. 31, 1998

[54] PERFORMING A POPULATION COUNT USING MULTIPLICATION

[75] Inventors: Ruby Bei-Loh Lee, Los Altos Hills, Calif.; Stephen L. Bass, Fort Collins, Colo.

[73] Assignee: Hewlett-Packard Company, Palo Alto, Calif.

[*] Notice: The term of this patent shall not extend beyond the expiration date of Pat. No. 5,636,351.

[21] Appl. No.: 499,758

[22] Filed: Jul. 7, 1995

[51] Int. Cl.$^6$ .............................. G06F 7/00; G06F 15/00; G06F 7/52
[52] U.S. Cl. .............. 364/754; 364/715.09; 364/750.5; 364/754; 364/784
[58] Field of Search .................. 364/754, 784, 364/715.09, 715.1, 715.11, 715.08, 750.5, 768; 395/376, 380, 800

[56] References Cited

U.S. PATENT DOCUMENTS

| | | | |
|---|---|---|---|
| 5,343,416 | 8/1994 | Eisig et al. | 364/757 |
| 5,541,865 | 7/1996 | Ashkenazi | 364/715.09 |
| 5,574,672 | 11/1996 | Briggs | 364/715.08 |
| 5,636,351 | 6/1997 | Lee | 395/800 |

*Primary Examiner*—Reba I. Elmore
*Assistant Examiner*—Emmanuel L. Moise

[57] ABSTRACT

A multiplier is modified to perform a population count. A first value is input to the multiplier in place of a first multiplicand. The first value is an operand upon which the population count is to be performed. A second value is input into the multiplier in place of a second multiplicand. Each bit of the second value is at logic one. In partial product rows, certain partial products are forced to logic zero. This is done so that only a single column of partial products is used to calculate the population count. The partial products are then summed to produce a result. The present invention also may be adapted for use with Booth-encoded multipliers.

15 Claims, 8 Drawing Sheets

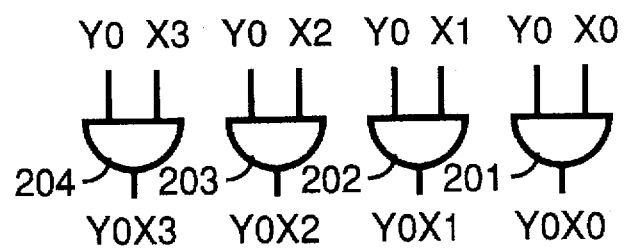
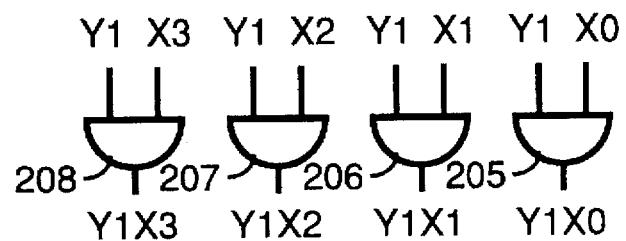
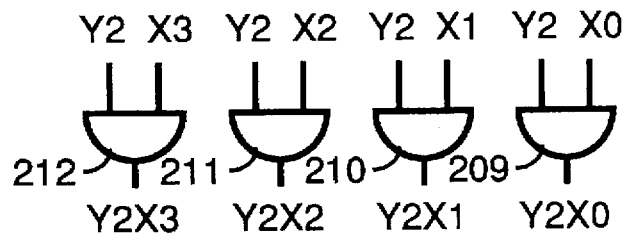
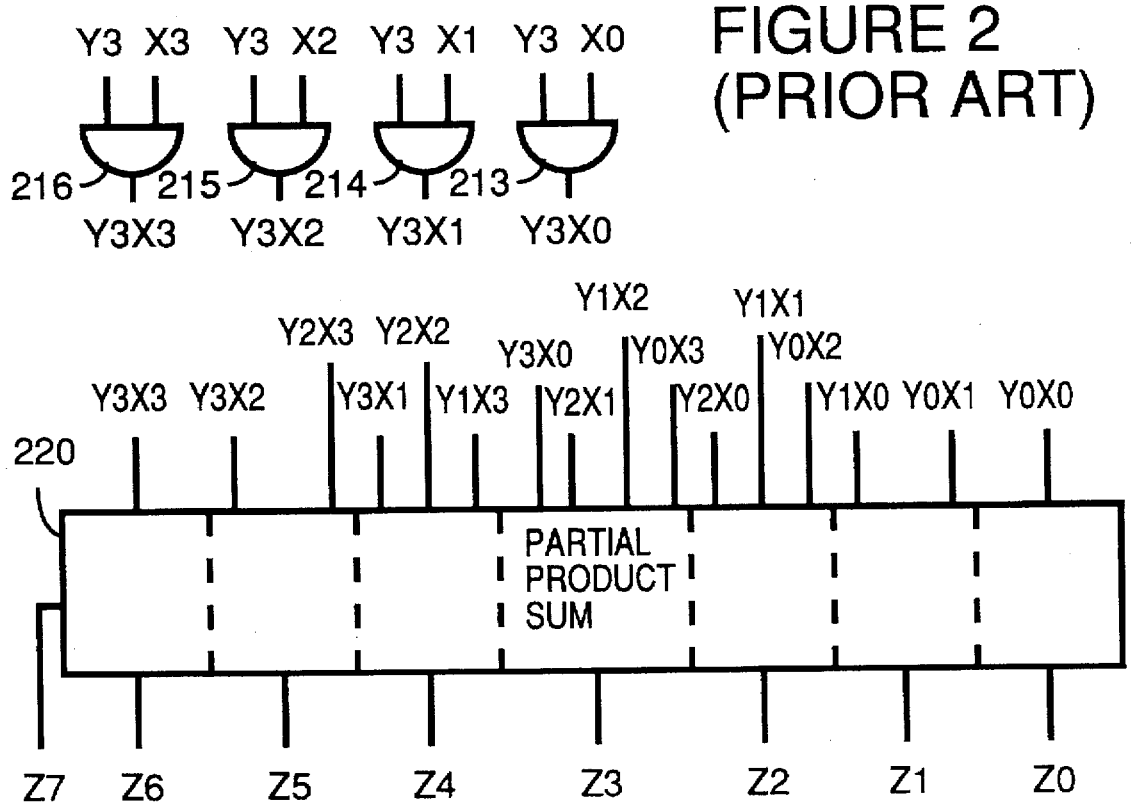
FIGURE 2
(PRIOR ART)

PERFORMING A POPULATION COUNT USING MULTIPLICATION

BACKGROUND

The present invention concerns computer operations implemented in hardware and particularly hardware which performs a population count.

In computer systems one or more arithmetic logic units (ALUs) are generally utilized to perform arithmetic operations. In addition to ALUs, high performance computing systems often include other special hardware to expedite the performance of specific tasks. For example, a computing system may include hardware devoted to performing multiplication and/or hardware devoted to performing division.

In some computing systems, special logic has been used to perform a population count. A population count refers to counting the number of "1"s in a string of bits. For example, the bit pattern "01111001" has a population count of 5. The population count of a string is useful for many types of algorithms and especially cryptographic analysis.

To implement special instructions to accelerate the computation of population counts, some prior art computers take a single operand from a processor register, typically 32 bits in size, and compute the population count of the operand. When a population count is needed for a binary string that is larger than fits into a register, the population count is performed in pieces with the number of pieces dependent on the register size. The result from each piece is then summed using normal add instructions to produce the final population count result.

For speed and efficiency reasons, population count instructions are implemented to execute in a single CPU cycle. However, because the population count function is computationally complex, implementing a single-cycle population count instruction becomes problematic for very high-performance, high clock frequency CPUs. Compounding the speed problem is the current trend toward computers with wider data widths. The industry trend today is away from 32 bits and toward 64 bits. This means a population count instruction must now compute a population count across twice the number of bits as in the past and this takes more time to perform. The time delay of the population count function is approximately proportional to the log of the number of bits in the operand. So, a population count over 16 bits might take 4 time units, over 32 bits 5 time units and over 64 bits 6 time units.

A problem with the prior art method of computing population counts is the time required for the entire "add" process to occur. Because full adders are used, sufficient time must be allowed for the carry bits from each level of the adders to propagate to produce the final result. For example, in a 2-bit adder adding two binary bit streams "11" and "01", time must be permitted for the carry from the least significant bit addition to carry to the next least significant position and finally for the carry to occur into the most significant bit position to generate the correct answer "100". The subsequent 3-bit adders will not be able to generate a correct answer until the 2-bit results stabilize and sufficient time expires for the carries generated by the 3-bit adders to propagate. This process continues for each subsequent level and the cumulative delay to allow for all the possible "carries" is significant.

It is desirable, therefore, to find alternate ways to calculate population counts which are both efficient and utilize a minimum of additional hardware.

SUMMARY OF THE INVENTION

In accordance with the preferred embodiment of the present invention, a multiplier is modified to perform a population count. A first value is input to the multiplier in place of a first multiplicand. The first value is an operand upon which the population count is to be performed. A second value is input into the multiplier in place of a second multiplicand. Each bit of the second value is at logic one. In partial product rows in the multiplier, certain partial products are forced to logic zero. This is done so that only a single column of partial products is used to calculate the population count. The partial products are then summed to produce a result.

In the preferred embodiment, the partial products are generated using three-input logic AND gates. Particular partial products are forced to zero by placing a zero on a control input of the three-input logic AND gate used to generate the partial product.

Also, in the preferred embodiment, the partial products are summed in two steps. In a first step, the partial products are reduced into two rows of partial products. A carry propagate addition is then performed on the two rows of partial products to produce the result.

The present invention also may be adapted for use with Booth-encoded multipliers. In one embodiment using a Booth-encoded multiplier, a first value is input to the multiplier in place of a first multiplicand. The first value is an operand upon which the population count is to be performed. Multi-bit digits of the first operand are encoded using a modified Booth-encoder. Each multi-bit digit is encoded to a count value which equals a population count of the multi-bit digit. A second value is input to the multiplier in place of a second multiplicand. A portion of partial products are forced to logic zero so that only a portion of partial products are used to calculate the population count. The partial products are then summed to produce a result.

The present invention allows for a implementation of a population count with only minor changes to a multiplier. The present invention is useful for all types of multipliers including both a traditional multiplier and a Booth-encoded multiplier.

BRIEF DESCRIPTION OF THE DRAWINGS

FIG. 2 shows a block diagram of a multiplier in accordance with the prior art.

DESCRIPTION OF THE PRIOR ART

Figure 1:
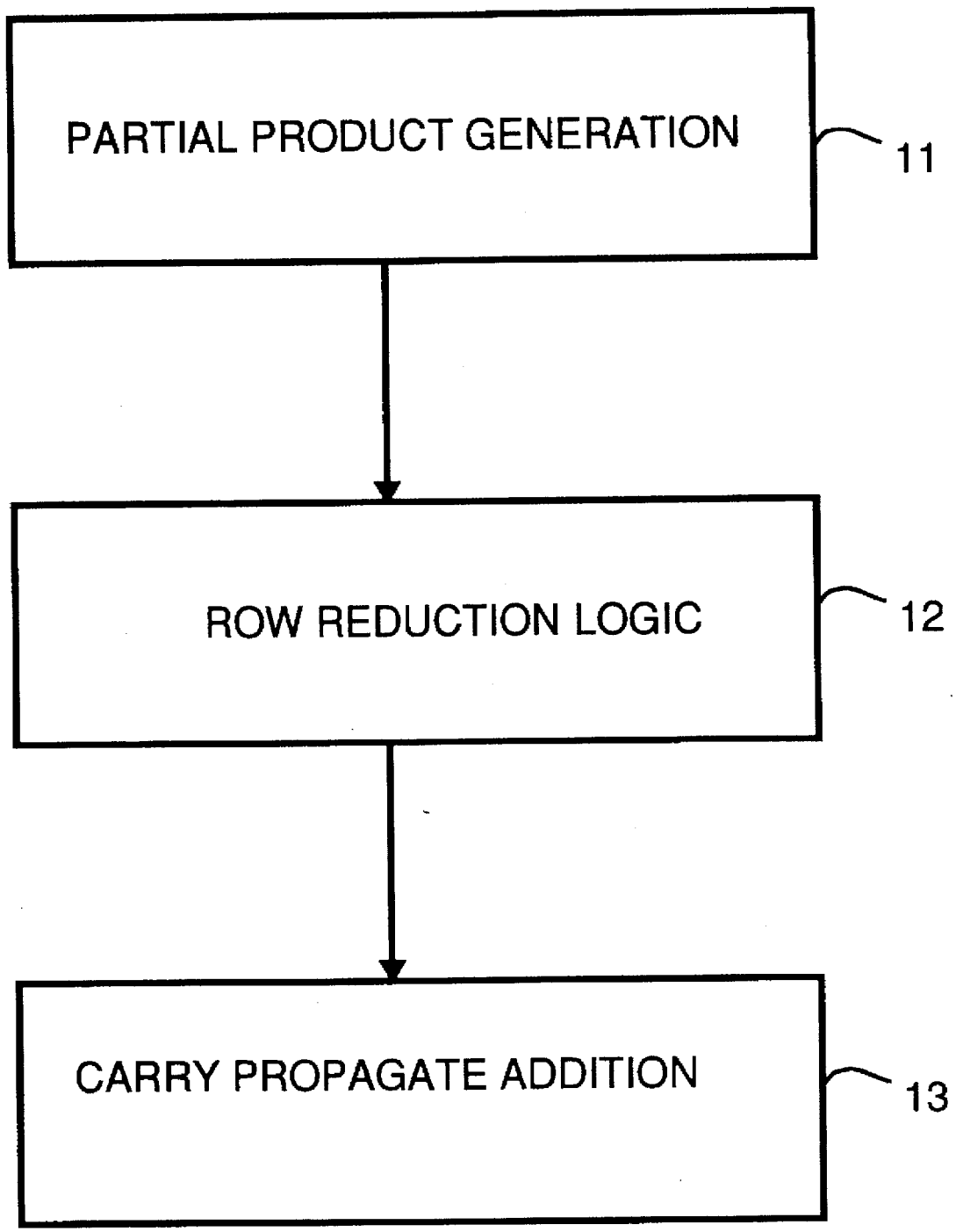
FIG. 1 shows a simplified block diagram of a multiplier in accordance with the prior art.

FIG. 1 shows a block diagram of an integer or mantissa multiplier. Partial product generation logic 11 generates rows of partial products. Row reduction logic 12 uses three-to-two counters to reduce the rows of partial products to two rows. A three-to-two counter is implemented using a one-bit adder slice which adds three one-bit inputs to produce a two-bit output. Other kinds of counters may be used. For example, five-to-three counters, seven-to-three counters or other counters may be used. Carry propagate addition logic 13 performs a full carry-propagate add on the two remaining rows to produce a final product.

FIG. 2 shows a four-bit multiplier in accordance with the prior art. The multiplier multiplies a four-bit first multiplicand $X_3X_2X_1X_0$ (base 2) with a four-bit second multiplicand $Y_3Y_2Y_1Y_0$ (base 2) to produce an eight-bit result $Z_7Z_6Z_5Z_4Z_3Z_2Z_1Z_0$ (base 2). As is understood by those skilled in the art, logic AND gates 201, 202, 203, 204, 205, 206, 207, 208, 209, 210, 211, 212, 213, 214, 215 and 216 may be used to generate partial products for the multiplication. A partial product sum circuit 220 sums the partial products generated by logic AND gates 201 through 216 to produce the result. Partial product sum circuit includes both reduction logic and carry propagate addition logic, as described above.

The two multiplicands, $X_3X_2X_1X_0$ and $Y_3Y_2Y_1Y_0$, the partial products generated by logic AND gates 201 through 216, and the result produced by partial product sum circuit 220 may be placed in a table in such a way as to summarize operation of the multiplier. For example, such a table is shown as Table 1 below:

TABLE 1

|   |   |   |   | $X_3$ | $X_2$ | $X_1$ | $X_0$ |   |
|---|---|---|---|---|---|---|---|---|
|   |   |   |   | $Y_0X_3$ | $Y_0X_2$ | $Y_0X_1$ | $Y_0X_0$ | $Y_0$ |
|   |   |   | $Y_1X_3$ | $Y_1X_2$ | $Y_1X_1$ | $Y_1X_0$ |   | $Y_1$ |

TABLE 1-continued

|   |   |   |   | $X_3$ | $X_2$ | $X_1$ | $X_0$ |   |
|---|---|---|---|---|---|---|---|---|
|   |   | $Y_2X_3$ | $Y_2X_2$ | $Y_2X_1$ | $Y_2X_0$ |   |   | $Y_2$ |
|   | $Y_3X_3$ | $Y_3X_2$ | $Y_3X_1$ | $Y_3X_0$ |   |   |   | $Y_3$ |
| $Z_7$ | $Z_6$ | $Z_5$ | $Z_4$ | $Z_3$ | $Z_2$ | $Z_1$ | $Z_0$ |   |

In the notation used in Table 1 above, the bit position of each bit of both multiplicands and the result is specifically identified. Additionally, the bits of the multiplicand which are used to form each partial product are specifically set out. As is understood by those skilled in the art, the information shown in Table 1 above may be set out using abbreviated or simplified notation, as in Table 2 below:

TABLE 2

|   |   |   |   | $X_3$ | $X_2$ | $X_1$ | $X_0$ |   |
|---|---|---|---|---|---|---|---|---|
|   |   |   |   | $X_3$ | $X_2$ | $X_1$ | $X_0$ | $Y_0$ |
|   |   |   | $X_3$ | $X_2$ | $X_1$ | $X_0$ |   | $Y_1$ |
|   |   | $X_3$ | $X_2$ | $X_1$ | $X_0$ |   |   | $Y_2$ |
|   | $X_3$ | $X_2$ | $X_1$ | $X_0$ |   |   |   | $Y_3$ |
| $Z_7$ | $Z_6$ | $Z_5$ | $Z_4$ | $Z_3$ | $Z_2$ | $Z_1$ | $Z_0$ |   |

In Table 2 above, each row of partial products is shown without the Y component. Thus, the first row of partial products is listed in Table 2 as follows:

$$X_3 \; X_2 \; X_1 \; X_O$$

However, this is a simplified notation which represents the following partial products:

$$Y_0X_3 \; Y_0X_2 \; Y_0X_1 \; Y_0X_0$$

Similarly, the last row of partial products listed in Table 2 represents the following partial products:

$$Y_3X_3 \; Y_3X_2 \; Y_3X_1 \; Y_3X_0$$

Using the simplified notation of Table 2, an eight-bit multiplier may be described as shown in Table 3 below:

TABLE 3

|   |   |   |   |   |   |   |   | $X_7$ | $X_6$ | $X_5$ | $X_4$ | $X_3$ | $X_2$ | $X_1$ | $X_0$ |   |
|---|---|---|---|---|---|---|---|---|---|---|---|---|---|---|---|---|
|   |   |   |   |   |   |   |   | $X_7$ | $X_6$ | $X_5$ | $X_4$ | $X_3$ | $X_2$ | $X_1$ | $X_0$ | $Y_0$ |
|   |   |   |   |   |   |   | $X_7$ | $X_6$ | $X_5$ | $X_4$ | $X_3$ | $X_2$ | $X_1$ | $X_0$ |   | $Y_1$ |
|   |   |   |   |   |   | $X_7$ | $X_6$ | $X_5$ | $X_4$ | $X_3$ | $X_2$ | $X_1$ | $X_0$ |   |   | $Y_2$ |
|   |   |   |   |   | $X_7$ | $X_6$ | $X_5$ | $X_4$ | $X_3$ | $X_2$ | $X_1$ | $X_0$ |   |   |   | $Y_3$ |
|   |   |   |   | $X_7$ | $X_6$ | $X_5$ | $X_4$ | $X_3$ | $X_2$ | $X_1$ | $X_0$ |   |   |   |   | $Y_4$ |
|   |   |   | $X_7$ | $X_6$ | $X_5$ | $X_4$ | $X_3$ | $X_2$ | $X_1$ | $X_0$ |   |   |   |   |   | $Y_5$ |
|   |   | $X_7$ | $X_6$ | $X_5$ | $X_4$ | $X_3$ | $X_2$ | $X_1$ | $X_0$ |   |   |   |   |   |   | $Y_6$ |
|   | $X_7$ | $X_6$ | $X_5$ | $X_4$ | $X_3$ | $X_2$ | $X_1$ | $X_0$ |   |   |   |   |   |   |   | $Y_7$ |
| $Z_{15}$ | $Z_{14}$ | $Z_{13}$ | $Z_{12}$ | $Z_{11}$ | $Z_{10}$ | $Z_9$ | $Z_8$ | $Z_7$ | $Z_6$ | $Z_5$ | $Z_4$ | $Z_3$ | $Z_2$ | $Z_1$ | $Z_0$ |   |

The multiplier shown in Table 3 multiplies an eight-bit first multiplicand $X_7X_6X_5X_4X_3X_2X_1X_0$(base 2) with an eight-bit second multiplicand $Y_7Y_6Y_5Y_4Y_3Y_2Y_1Y_0$(base 2) to produce an sixteen-bit result $Z_{15}Z_{14}Z_{13}Z_{12}Z_{11}Z_{10}Z_9Z_8Z_7Z_6Z_5Z_4Z_3Z_2Z_1Z_0$(base 2). To further simplify notation, the partial products and the sixteen-bit result may be written without subscripts. Thus, the eight-bit multiplication may be represented as in Table 4 below:

TABLE 4

|   | $X_7$ | $X_6$ | $X_5$ | $X_4$ | $X_3$ | $X_2$ | $X_1$ | $X_0$ |   |
|---|---|---|---|---|---|---|---|---|---|
|   |   | X | X | X | X | X | X | X | X | $Y_0$ |
|   | X | X | X | X | X | X | X | X |   | $Y_1$ |

TABLE 4-continued

|  |  |  |  |  |  |  |  | $X_7$ | $X_6$ | $X_5$ | $X_4$ | $X_3$ | $X_2$ | $X_1$ | $X_0$ |  |
|---|---|---|---|---|---|---|---|---|---|---|---|---|---|---|---|---|
|  |  |  |  |  |  |  |  |  | X | X | X | X | X | X | X | $Y_2$ |
|  |  |  |  |  |  |  |  | X | X | X | X | X | X | X | X | $Y_3$ |
|  |  |  |  |  |  |  | X | X | X | X | X | X | X | X |  | $Y_4$ |
|  |  |  |  |  |  | X | X | X | X | X | X | X | X |  |  | $Y_5$ |
|  |  |  |  |  | X | X | X | X | X | X | X | X |  |  |  | $Y_6$ |
|  |  |  |  | X | X | X | X | X | X | X | X |  |  |  |  | $Y_7$ |
| Z | Z | Z | Z | Z | Z | Z | Z | Z | Z | Z | Z | Z | Z | Z | Z |  |

DESCRIPTION OF THE PREFERRED EMBODIMENT

Generally, most of the circuitry and execution latency of a multiplier exists in row reduction logic 12 and carry propagate addition logic 13. In the preferred embodiment, no changes are made to row reduction logic 12 or carry propagate additional logic 13 of a multiplier in order to perform a population count. But in partial product generation logic 11, the two input logic AND gates are replaced with three input logic AND gates.

Figure 3:
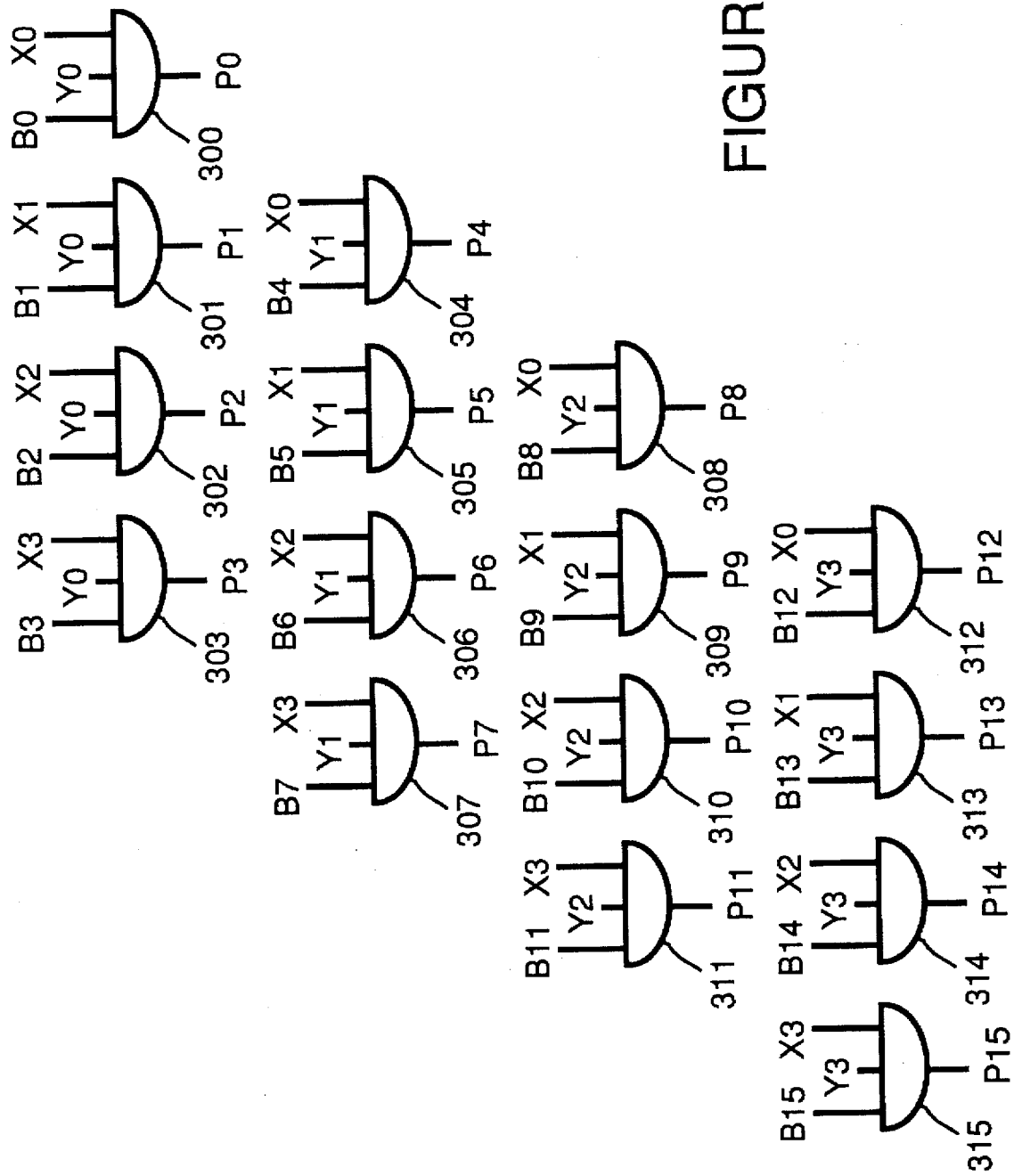
FIG. 3 shows a simplified block diagram of circuitry which generates partial products for a modified multiplier in accordance with the preferred embodiment of the present invention.

FIG. 3 shows that in partial product generation logic 11, the two input logic AND gates are replaced with three input logic AND gates. The multiplier multiplies a four-bit first multiplicand $X_3X_2X_1X_0$ (base 2) with a four-bit second multiplicand $Y_3Y_2Y_1Y_0$ (base 2) to produce an eight-bit result $Z_7Z_6Z_5Z_4Z_3Z_2Z_1Z_0$ (base 2). As is understood by those skilled in the art, logic AND gates 300, 301, 302, 303, 304, 305, 306, 307, 308, 309, 310, 311, 312, 313, 314 and 315 may be used to generate partial products for the multiplication. When generating partial products for multiplication, control inputs $B_0$, $B_1$, $B_2$, $B_3$, $B_4$, $B_5$, $B_6$, $B_7$, $B_8$, $B_9$, $B_{10}$, $B_{11}$, $B_{12}$, $B_{13}$, $B_{14}$ and $B_{15}$ are all set to logic 1 in order to generate partial products $P_0$, $P_1$, $P_2$, $P_3$, $P_4$, $P_5$, $P_6$, $P_7$, $P_8$, $P_9$, $P_{10}$, $P_{11}$, $P_{12}$, $P_{13}$, $P_{14}$ and $P_{15}$.

In addition, selection of multiplicands and selection of values of control inputs $B_0$, $B_1$, $B_2$, $B_3$, $B_4$, $B_5$, $B_6$, $B_7$, $B_8$, $B_9$, $B_{10}$, $B_{11}$, $B_{12}$, $B_{13}$, $B_{14}$ $_{and\ B15}$ can be used to perform a population count as is further described below.

Particularly, when a population count is to be performed on a first value within a register, the first value in the register is input in place of the first multiplicand for the multiplier. A second value is input into the multiplier in place of the second multiplicand. Each bit of the second value is at logic one. All partial products in the multiplier, except for partial products in the longest column, are forced to logic zero.

Figure 4:
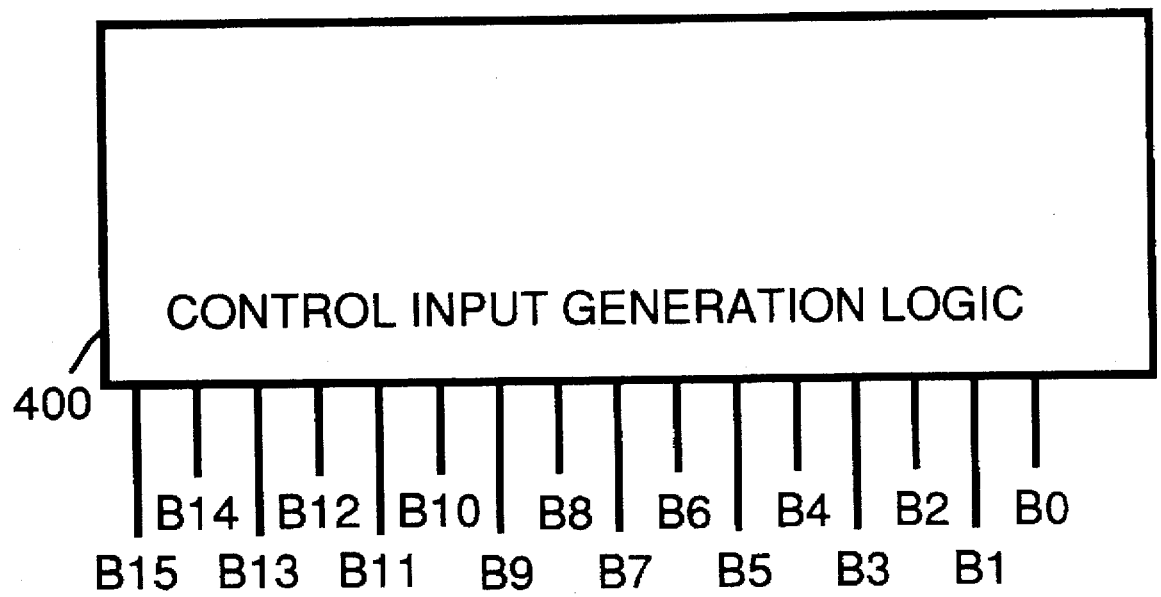
FIG. 4 shows a simplified block diagram of circuitry which generates control inputs used to generate partial products for a modified multiplier in accordance with the preferred embodiment of the present invention.

FIG. 4 shows control input generation 400 which generates control inputs $B_0$, $B_1$, $B_2$, $B_3$, $B_4$, $B_5$, $B_6$, $B_7$, $B_8$, $B_9$, $B_{10}$, $B_{11}$, $B_{12}$, $B_{13}$, $B_{14}$ and $B_{15}$ for a population count. Control input generation 400 generates control inputs $B_0$, $B_1$, $B_2$, $B_3$, $B_4$, $B_5$, $B_6$, $B_7$, $B_8$, $B_9$, $B_{10}$, $B_{11}$, $B_{12}$, $B_{13}$, $B_{14}$ and $B_{15}$, for example, during register read-out time so that generation of the control inputs does not delay operations performed by the multiplier. In addition, control input generation may be used to generate control inputs $B_0$, $_{B1}$, $_{B2}$, $_{B3}$, $B_4$, $B_5$, $B_6$, $B_7$, $B_8$, $B_9$, $B_{10}$, $B_{11}$, $B_{12}$, $B_{13}$, $B_{14}$ and $B_{15}$.

For example, in order to perform a population count on an eight-bit word, "abcdefgh," using a modified eight-bit multiplier, the value "abcdefgh" is used in place of the first multiplicand $X_7X_6X_5X_4X_3X_2X_1X_0$(base 2). The value 11111111 is used in place of an eight-bit second multiplicand $Y_7Y_6Y_5Y_4Y_3Y_2Y_1Y_0$(base 2). For the population count, every partial product is forced to logic zero except for the partial products in the longest column.

Table 5 below illustrates the use of a modified multiplier to perform this population count:

TABLE 5

|  |  |  |  |  |  |  | a | b | c | d | e | f | g | h |  |
|---|---|---|---|---|---|---|---|---|---|---|---|---|---|---|---|
|  |  |  |  |  |  |  | a | * | * | * | * | * | * | * | 1 |
|  |  |  |  |  |  | * | b | * | * | * | * | * | * |  | 1 |
|  |  |  |  |  | * | * | c | * | * | * | * | * |  |  | 1 |
|  |  |  |  | * | * | * | d | * | * | * | * |  |  |  | 1 |
|  |  |  | * | * | * | * | e | * | * | * |  |  |  |  | 1 |
|  |  | * | * | * | * | * | f | * | * |  |  |  |  |  | 1 |
|  | * | * | * | * | * | * | g | * |  |  |  |  |  |  | 1 |
| * | * | * | * | * | * | * | h |  |  |  |  |  |  |  | 1 |
| 0 | 0 | 0 | 0 | 0 | Z | Z | Z | Z | 0 | 0 | 0 | 0 | 0 | 0 |  |

In Table 5 above, each "*" indicates a value forced to logic zero by a control input. The result of the population count is the value "ZZZZ". In the result register, this value is shifted seven bits to the left of the least significant bit.

For example, in order to perform a population count on a sixteen-bit word, "abcdefghijklmnop," using a modified sixteen-bit multiplier, the value "abcdefghijklmnop" is used in place of the first multiplicand. The value 1111111111111111 is used in place of a sixteen-bit second multiplicand. For the population count, every partial product is forced to logic zero except for the partial products in the longest column.

Table 6 below illustrates the use of a modified multiplier to perform this population count:

TABLE 6

| abcdefghijklmnop | |
|---|---|
| a*************** | 1 |
| *b************** | 1 |
| c*********** | 1 |
| *d********** | 1 |
| **e********* | 1 |
| ***f******** | 1 |
| ****g******* | 1 |
| *****h****** | 1 |

TABLE 6-continued

| abcdefghijklmnop | |
|---|---|
| *******i**** | 1 |
| *******j*** | 1 |
| ********k*** | 1 |
| *********l** | 1 |
| **********m* | 1 |
| ***********n | 1 |
| **************o* | 1 |
| ***************p | 1 |
| 000000000000ZZZZZ000000000000 | |

In Table 6 above, each "*" indicates a value forced to logic zero by a control input. The result of the population count is the value "ZZZZZ". In the result register, this value is shifted fifteen bits to the left of the least significant bit.

Extending the teaching of the present invention, a population count may also be computed using a Booth-encoded multiplier. In order to best understand how this may be done, a discussion of the operation of a Booth-encoded multiplier follows.

Table 7 below illustrates the basic concept of a multiply. The example given shows a 9-bit by 9-bit multiply.

TABLE 7

| | | | | | | | | $X_8$ | $X_7$ | $X_6$ | $X_5$ | $X_4$ | $X_3$ | $X_2$ | $X_1$ | $X_0$ | |
|---|---|---|---|---|---|---|---|---|---|---|---|---|---|---|---|---|---|
| | | | | | | | | | X | X | X | X | X | X | X | X | X | $Y_0$ |
| | | | | | | | | X | X | X | X | X | X | X | X | X | | $Y_1$ |
| | | | | | | | X | X | X | X | X | X | X | X | X | | | $Y_2$ |
| | | | | | | X | X | X | X | X | X | X | X | X | | | | $Y_3$ |
| | | | | | X | X | X | X | X | X | X | X | X | | | | | $Y_4$ |
| | | | | X | X | X | X | X | X | X | X | X | | | | | | $Y_5$ |
| | | | X | X | X | X | X | X | X | X | X | | | | | | | $Y_6$ |
| | | X | X | X | X | X | X | X | X | X | | | | | | | | $Y_7$ |
| | X | X | X | X | X | X | X | X | X | | | | | | | | | $Y_8$ |
| Z | Z | Z | Z | Z | Z | Z | Z | Z | Z | Z | Z | Z | Z | Z | Z | Z | | |

In order to reduce the size of the partial product array, multiplier "$Y_8Y_7Y_6Y_5Y_4Y_3Y_2Y_1Y_0$(base 2)" is encoded using 2 or more bits at a time. Table 8 below takes 3 bits of "$Y_8Y_7Y_6Y_5Y_4Y_3Y_2Y_1Y_0$(base 2)" at a time to generate the multiplier "d." Each digit of "D" ($D_0$, $D_1$, $D_2$) is an octal digit, and represents 3 bits of "$Y_8Y_7Y_6Y_5Y_4Y_3Y_2Y_1Y_0$ (base 2)." This is called radix-8 encoding.

TABLE 8

| | | | | | | | $X_8$ | $X_7$ | $X_6$ | $X_5$ | $X_4$ | $X_3$ | $X_2$ | $X_1$ | $X_0$ | |
|---|---|---|---|---|---|---|---|---|---|---|---|---|---|---|---|---|
| | | | | X | X | X | X | X | X | X | X | X | X | X | X | $D_0$ |
| | X | X | X | X | X | X | X | X | X | X | X | | | | | $D_1$ |
| X | X | X | X | X | X | X | X | X | X | X | | | | | | $D_2$ |
| Z | Z | Z | Z | Z | Z | Z | Z | Z | Z | Z | Z | Z | Z | Z | Z | |

Each row of partial products (X) is generated by taking the appropriate multiple of the multiplicand "$X_8X_7X_6X_5X_4X_3X_2X_1X_0$(base 2)", determined by each octal digit in "D." For example, the first row of partial products is equal to $D_0$ times $X_8X_7X_6X_5X_4X_3X_2X_1X_0$(base 2). Note that each partial product row has a significance of three bits greater than the previous partial product row. This is because the multiplier has been encoded three bits at a time.

Figure 5:
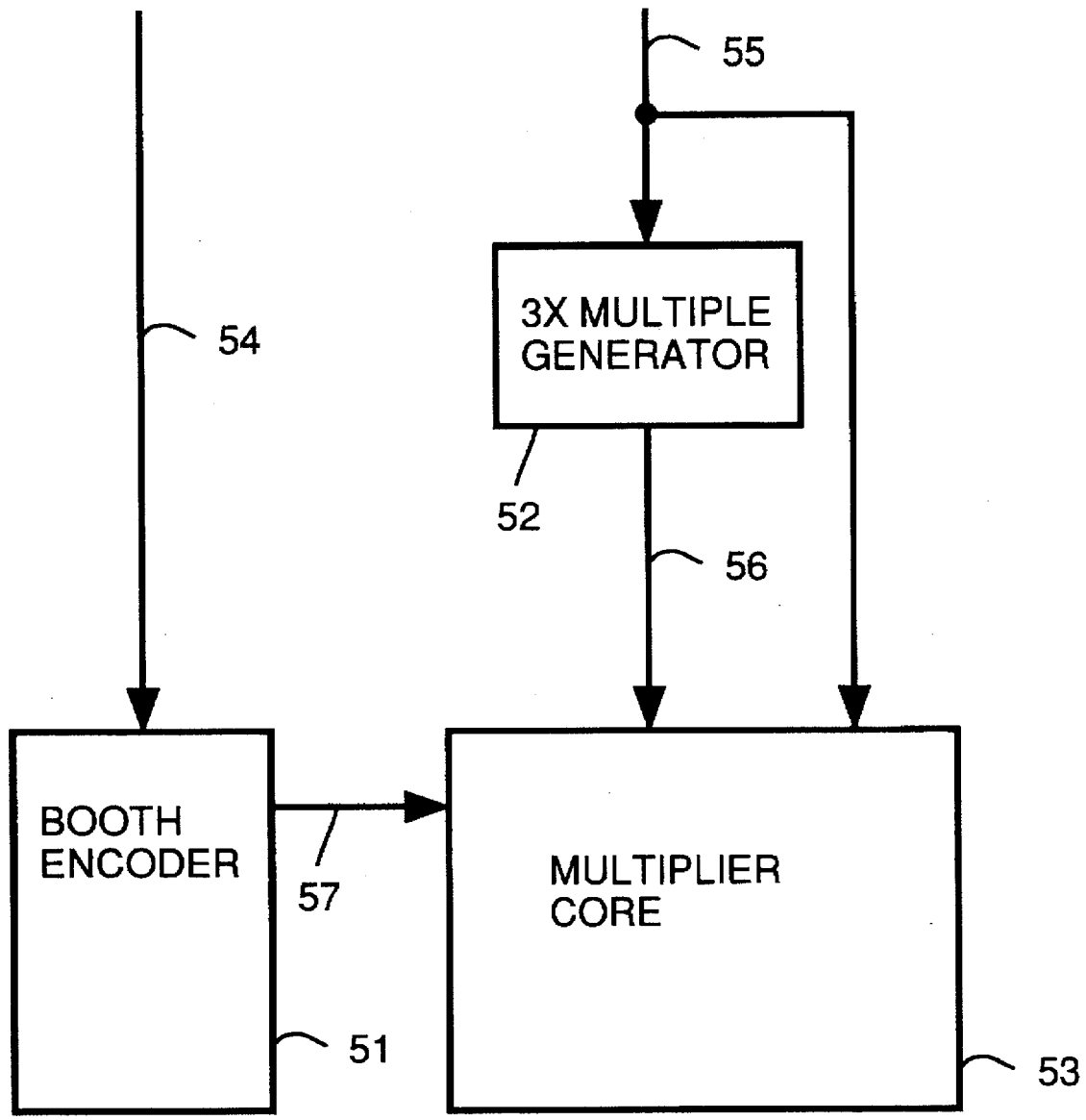
FIG. 5 shows a simplified block diagram of a Booth-encoded multiplier in accordance with the prior art.

FIG. 5 shows a block diagram of a hardware implementation of a radix-8, Booth-encoded multiplier in accordance with the prior art. A Booth encoder 51 encodes three-bit digits of a multiplying operand "Y" on lines 54 to produce from each three-bit digit a Booth-encoded digit. The range of each of the three-bit digit input to Booth encoder 51 is zero through seven. When encoding a three-bit digit, if a three-bit digit has a value greater than or equal to 4, Booth encoder 51, subtracts 8 from the value of the current digit and adds one to the next higher (more significant) digit. Thus the range of Booth-encoded digits is from −4 to 4. Radix-8 Booth encoding is accomplished by examining 4 bits at a time: the 3 bits being encoded, plus the previous bit. The previous bit indicates whether the previous digit was greater than or equal to 4, and hence whether one must be added to the current digit. Booth encoder 51 encodes each three-bit digit of the multiplying operand "Y" in accordance with truth Table 9 below:

TABLE 9

| Three-Bit Digit Input | | | | Booth-Encoded Digit Output | | | | | |
|---|---|---|---|---|---|---|---|---|---|
| Bit | | | Previous | | | | | | |
| Bit 2 | 1 | Bit 0 | Bit | zero | one | two | three | four | neg. |
| 0 | 0 | 0 | 0 | 1 | 0 | 0 | 0 | 0 | 0 |
| 0 | 0 | 0 | 1 | 0 | 1 | 0 | 0 | 0 | 0 |

TABLE 9-continued

| Three-Bit Digit Input | | | | Booth-Encoded Digit Output | | | | | |
|---|---|---|---|---|---|---|---|---|---|
| Bit 2 | Bit 1 | Bit 0 | Previous Bit | zero | one | two | three | four | neg. |
| 0 | 0 | 1 | 0 | 0 | 1 | 0 | 0 | 0 | 0 |
| 0 | 0 | 1 | 1 | 0 | 0 | 1 | 0 | 0 | 0 |
| 0 | 1 | 0 | 0 | 0 | 0 | 1 | 0 | 0 | 0 |
| 0 | 1 | 0 | 1 | 0 | 0 | 0 | 1 | 0 | 0 |
| 0 | 1 | 1 | 0 | 0 | 0 | 0 | 1 | 0 | 0 |
| 0 | 1 | 1 | 1 | 0 | 0 | 0 | 0 | 1 | 0 |
| 1 | 0 | 0 | 0 | 0 | 0 | 0 | 0 | 1 | 1 |
| 1 | 0 | 0 | 1 | 0 | 0 | 0 | 1 | 0 | 1 |
| 1 | 0 | 1 | 0 | 0 | 0 | 0 | 1 | 0 | 1 |
| 1 | 0 | 1 | 1 | 0 | 0 | 1 | 0 | 0 | 1 |
| 1 | 1 | 0 | 0 | 0 | 0 | 1 | 0 | 0 | 1 |
| 1 | 1 | 0 | 1 | 0 | 1 | 0 | 0 | 0 | 1 |
| 1 | 1 | 1 | 0 | 0 | 1 | 0 | 0 | 0 | 1 |
| 1 | 1 | 1 | 1 | 1 | 0 | 0 | 0 | 0 | 0 |

The Booth-encoded digit output is composed of Booth-encoded digits which together are equal to multiplying operand "Y". Each Booth-encoded digit will be used as a multiplier for multiplying a multiplicand "X" on lines 55. When bit "zero" of a Booth-encoded digit is at logic 1, then the multiplicand "X" is multiplied by zero to produce a partial product row. When bit "one" of a Booth-encoded digit is at logic 1, then the multiplicand "X" is multiplied by one to produce a partial product row. When bit "two" of a Booth-encoded digit is at logic 1, then the multiplicand "X" is multiplied by two to produce a partial product row. When bit "three" of a Booth-encoded digit is at logic 1, then the multiplicand "X" is multiplied by three to produce a partial product row. When bit "four" of a Booth-encoded digit is at logic 1, then the multiplicand "X" is multiplied by four to produce a partial product row. When bit "negative" of a Booth-encoded digit is at logic 1, this indicates that the multiplicand "X" is multiplied by negative one when producing a partial product row.

Output lines 57 of Booth encoder 51 includes a Booth-encoded digit output for each three-digit input of multiplying operand "Y". Thus, output lines 57 is composed of six busses: zero[h-1:0], one[h-1:0], two[h-1:0], three[h-1:0], four[h-1:0], and neg.[h-1:0], where "h" is the height of the partial product array, and is equal to the n-tuber of bits of multiplying operand "Y" divided by three. If the multiplying operand "Y" is not exactly divisible by three, then h is equal to the next highest number that is exactly divisible by three, divided by three.

All the needed multiples of the multiplicand "X" (from −4 to 4) on lines 55 can be derived by simply shifting and/or complementing "X." All, that is except for the +/−3 multiples. The three times (3×) multiple must be computed ahead of time. This is accomplished by the 3× multiple block 52, which produces on lines 56 a 3× multiple of multiplicand X.

A multiplier core 53 uses the encoded multiplier information on lines 57, the multiplicand X on lines 55, and the 3× multiplicand on lines 56 to compute each one-bit partial product.

Figure 6:
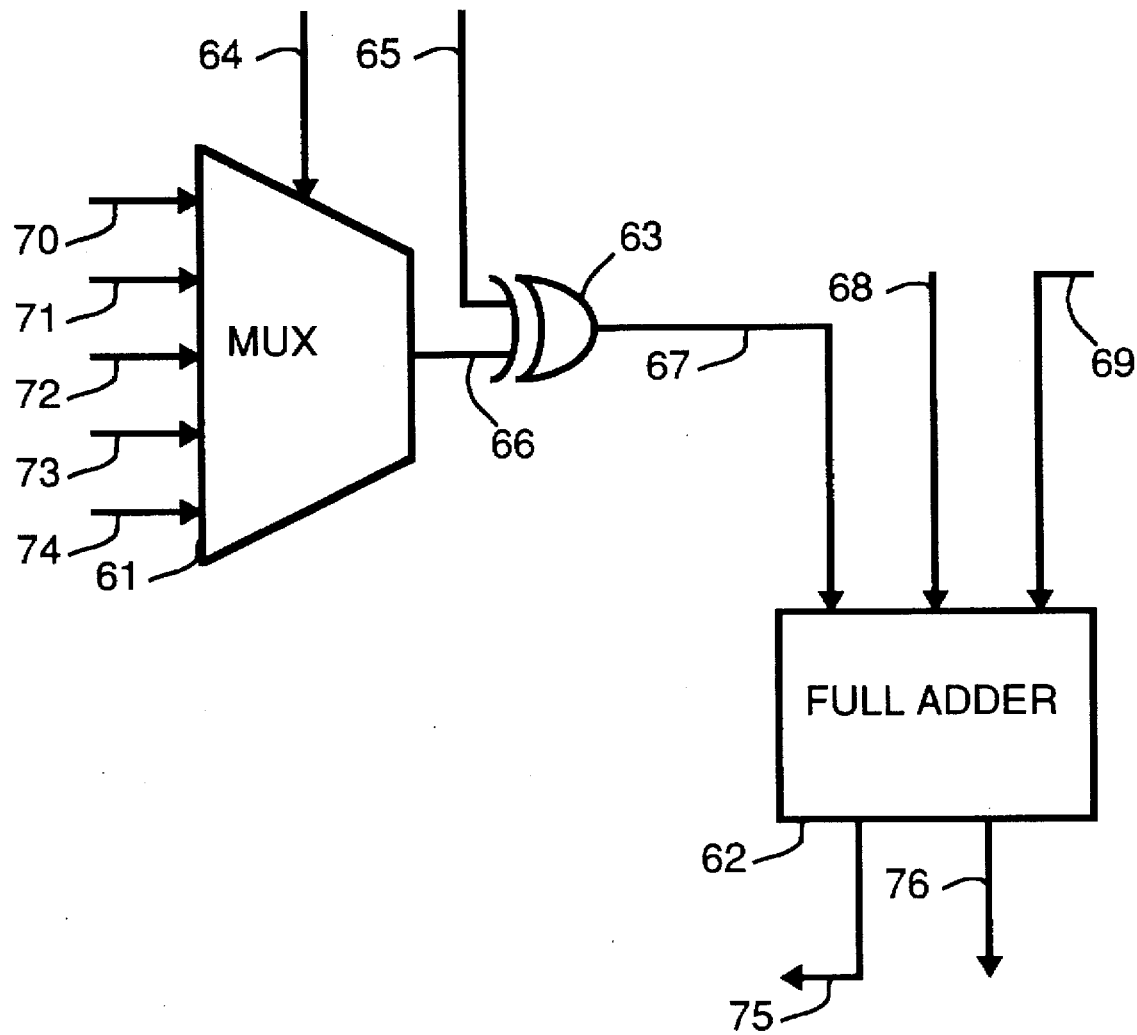
FIG. 6 shows a block diagram of circuitry which generates a partial product within the Booth-encoded multiplier shown in FIG. 5.

FIG. 6 shows a block diagram of a cell which produces a single partial product bit. A multiplexor 61 selects a bit from one of lines 70, 71, 72, 73 or 74. On line 70 is the value logic zero. On line 71 is a single corresponding bit value for X. On line 72 is a single corresponding bit value for two times X (X shifted one bit to the left). On line 73 is a single corresponding bit value for three times X (from 3× multiple generator 82). On line 74 is a single corresponding bit value for four times X (X shifted two bits to the left).

Select lines 64 are based on the corresponding Booth-encoded digit. When bit "zero" of the booth-encoded digit is at logic 1, then multiplexor 64 selects line 70. When bit "one" of the Booth-encoded digit is at logic 1, then multiplexor 64 selects line 71. When bit "two" of the Booth-encoded digit is at logic 1, then multiplexor 64 selects line 72. When bit "three" of the Booth-encoded digit is at logic 1, then multiplexor 64 selects line 73. When bit "four" of the Booth-encoded digit is at logic 1, then multiplexor 64 selects line 74. Bit "negative" of the Booth-encoded digit is placed on line 65. When the "negative" of the Booth-encoded digit is at logic 1, a logic XOR gate 66 inverts the output of multiplexor 61 on line 66 to produce an input on line 67 to full adder 62.

Full adder 62 sums the value on line 67, a sum output from a full adder from a cell immediately above (which is zero if there is no cell immediately above), and a carry-out of the cell to the upper right (which is zero if there is no cell to the upper right) to produce a sum bit on a line 76 and a carry-out bit on a line 75. The cells within multiplier core 53 sum up the partial products, and the sum and carry-out of the bottom cells of the array are the inputs to a final adder that produces the final result. The full adders of all the cells essentially operate as the row reduction logic for the Booth-encoded multiplier.

The Booth-encoded multiplier shown in FIGS. 5 and 6 may be modified, in accordance with the preferred embodiment, to allow performance of a population count.

Figure 7:
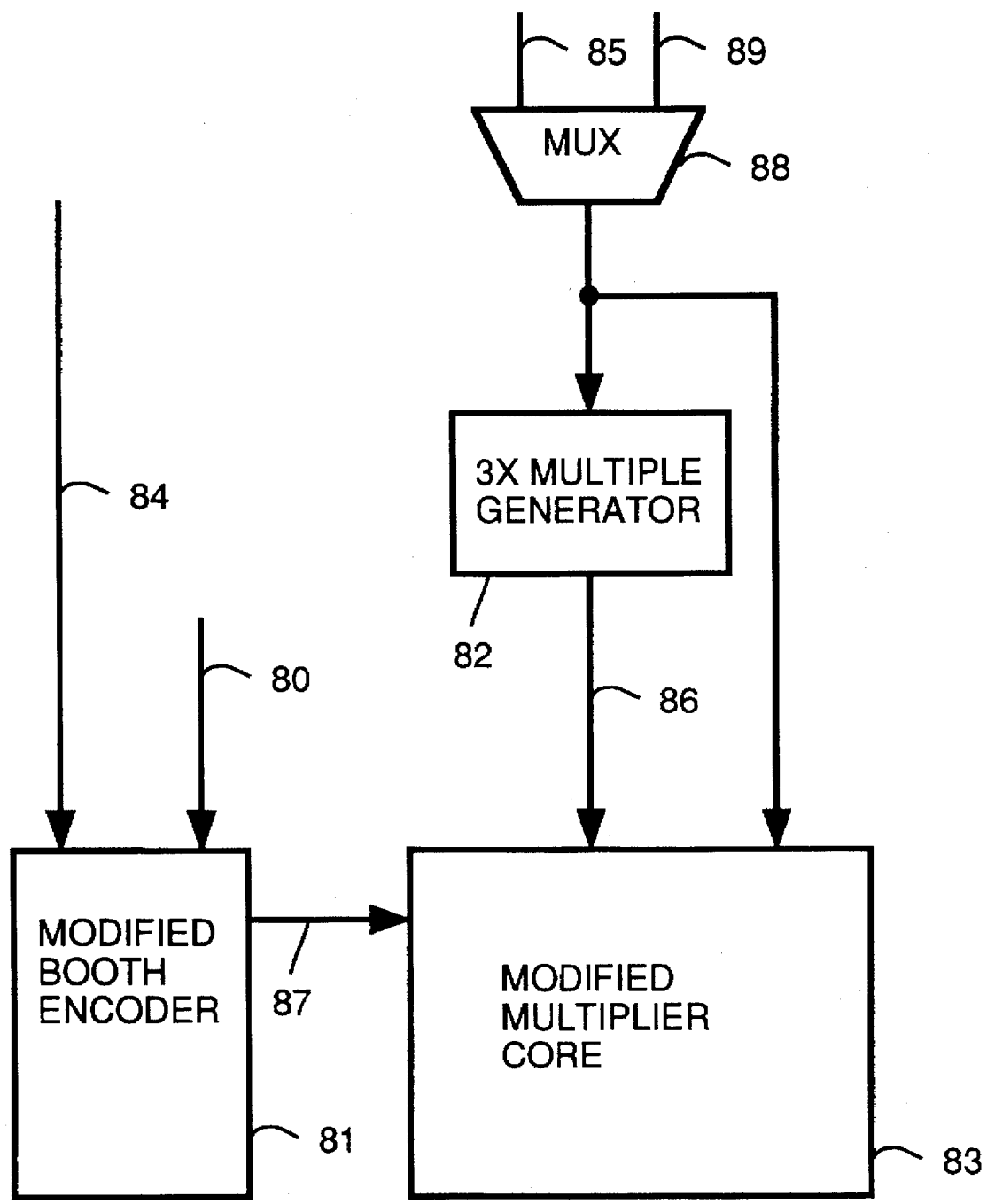
FIG. 7 shows a simplified block diagram of a Booth-encoded multiplier in accordance with the preferred embodiment of the present invention.

FIG. 7 shows a block diagram of a hardware implementation of a radix-8, Booth-encoded multiplier, modified to allow calculation of population counts in accordance with the preferred embodiment. A modified Booth encoder 81 encodes three-bit digits of a multiplying operand "Y" on lines 84 to produce from each three-bit digit a Booth-encoded digit. The range of each of the three-bit digit input to modified Booth encoder 81 is zero through seven. When encoding a three-bit digit, if a three-bit digit has a value greater than or equal to 4, modified Booth encoder 81, subtracts 8 from the value of the current digit and adds one to the next higher (more significant) digit. Thus the range of Booth-encoded digits is from −4 to 4. Radix-8 Booth encoding is accomplished by examining 4 bits at a time: the 3 bits being encoded, plus the previous bit. The previous bit indicates whether the previous digit was greater than or equal to 4, and hence whether one must be added to the current digit.

In addition, modified Booth encoder 81 includes a selection line 80 which allows selection of either a normal mode or a population count mode. When in normal mode, modified Booth encoder 81 encodes each three-bit digit of the multiplying operand "Y" in accordance with the values set out in truth Table 9 shown above. When in population count mode, modified Booth encoder 81 produces a population count value for each three-bit digit of the multiplying operand "Y" in accordance with Table 10 as shown below:

TABLE 10

| Three-Bit Digit Input | | | | Population Count Value | | | | | |
|---|---|---|---|---|---|---|---|---|---|
| Bit 2 | Bit 1 | Bit 0 | Previous Bit | zero | one | two | three | four | neg. |
| 0 | 0 | 0 | X | 1 | 0 | 0 | 0 | 0 | 0 |
| 0 | 0 | 0 | X | 1 | 0 | 0 | 0 | 0 | 0 |
| 0 | 0 | 1 | X | 0 | 1 | 0 | 0 | 0 | 0 |
| 0 | 0 | 1 | X | 0 | 1 | 0 | 0 | 0 | 0 |
| 0 | 1 | 0 | X | 0 | 1 | 0 | 0 | 0 | 0 |

TABLE 10-continued

| Three-Bit Digit Input | | | | Population Count Value | | | | | |
|---|---|---|---|---|---|---|---|---|---|
| Bit 2 | Bit 1 | Bit 0 | Previous Bit | zero | one | two | three | four | neg. |
| 0 | 1 | 0 | X | 0 | 1 | 0 | 0 | 0 | 0 |
| 0 | 1 | 1 | X | 0 | 0 | 1 | 0 | 0 | 0 |
| 0 | 1 | 1 | X | 0 | 0 | 1 | 0 | 0 | 0 |
| 1 | 0 | 0 | X | 0 | 1 | 0 | 0 | 0 | 0 |
| 1 | 0 | 0 | X | 0 | 1 | 0 | 0 | 0 | 0 |
| 1 | 0 | 1 | X | 0 | 0 | 1 | 0 | 0 | 0 |
| 1 | 0 | 1 | X | 0 | 0 | 1 | 0 | 0 | 0 |
| 1 | 1 | 0 | X | 0 | 0 | 1 | 0 | 0 | 0 |
| 1 | 1 | 0 | X | 0 | 0 | 1 | 0 | 0 | 0 |
| 1 | 1 | 1 | X | 0 | 0 | 0 | 1 | 0 | 0 |
| 1 | 1 | 1 | X | 0 | 0 | 0 | 1 | 0 | 0 |

Each population count value which is output from modified Booth encoder 81 is a population count of the corresponding three-bit digit input. Thus the output busses of modified Booth encoder 81 on output lines 87 hold the population count for each three bit digit of the input "Y" multiplicand operand.

In normal mode, a modified multiplier core 83 uses the encoded multiplier information on lines 87, the multiplicand X on lines 85, and the 3× multiplicand on lines 86 to compute each one-bit partial product. When in population count mode, a multiplexor 88 selects a new value on lines 89 instead of multiplicand X. The new value on line 89 is the binary number 001001001 for a nine-bit multiplier.

Figure 8:
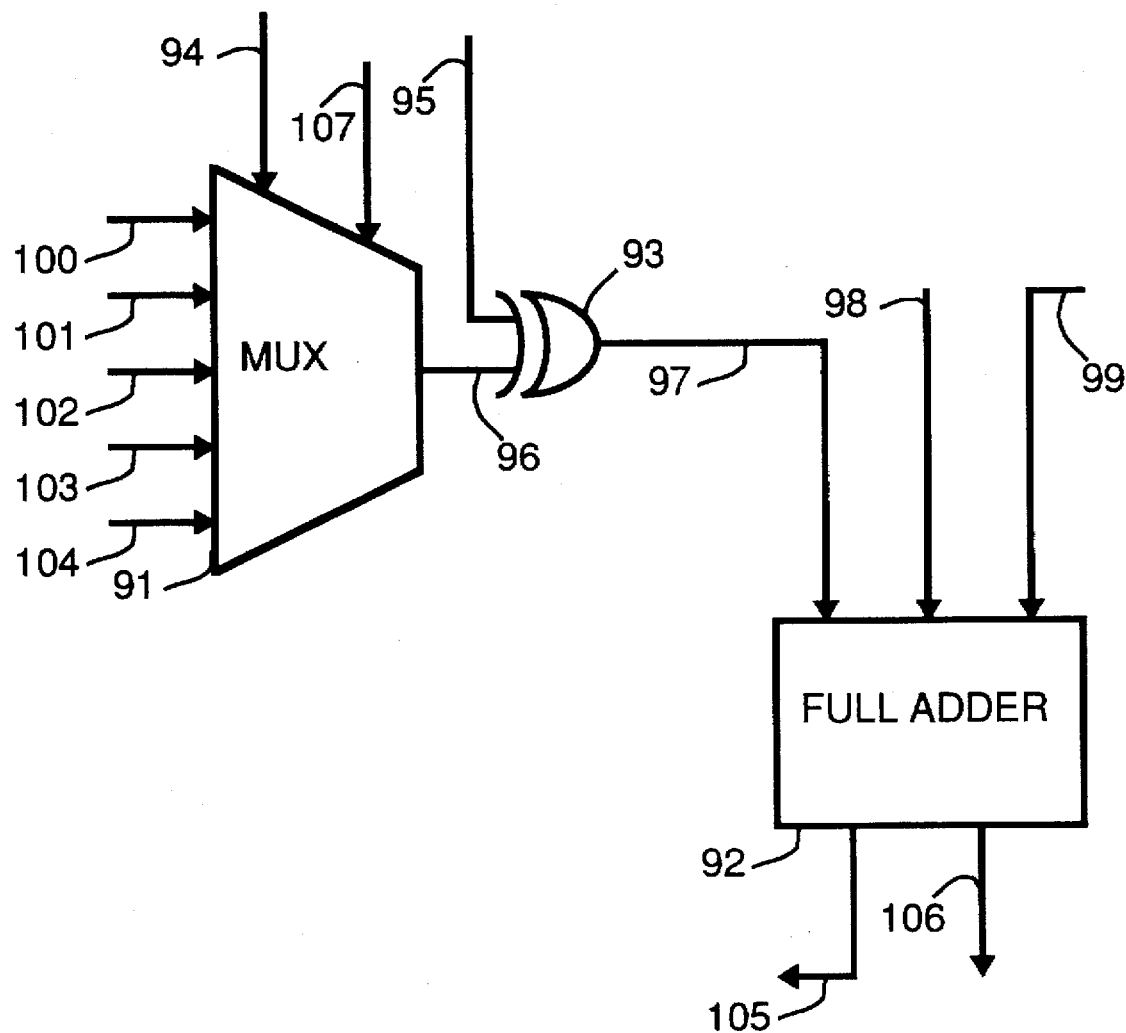
FIG. 8 shows a block diagram of circuitry which generates a partial product within the Booth-encoded multiplier shown in FIG. 7 in accordance with the preferred embodiment of the present invention.

FIG. 8 shows a block diagram of a modified cell which produces a single partial product bit. In normal mode, a multiplexor 91 selects a bit from one of lines 100, 101, 102, 103 or 104. On line 100 is the value logic zero. On line 101 is a single corresponding bit value for X. On line 102 is a single corresponding bit value for two times X (X shifted one bit to the left). On line 103 is a single corresponding bit value for three times X (from 3× multiple generator 82). On line 102 is a single corresponding bit value for four times X (X shifted two bits to the left).

Select lines 94 are based on the corresponding Booth-encoded digit (or population count value when in population count mode). When bit "zero" of the Booth-encoded digit (or population count value) is at logic 1, then multiplexor 94 selects line 100. When bit "one" of the Booth-encoded digit (or population count value) is at logic 1, then multiplexor 94 selects line 101. When bit "two" of the Booth-encoded digit (or population count value) is at logic 1, then multiplexor 94 selects line 102. When bit "three" of the Booth-encoded digit (or population count value) is at logic 1, then multiplexor 94 selects line 103. When bit "four" of the Booth-encoded digit is at logic 1, then multiplexor 94 selects line 104. Bit "negative" of the Booth-encoded digit is placed on line 95. When the "negative" of the Booth-encoded digit is at logic 1, a logic XOR gate 96 inverts the output of multiplexor 91 on line 96 to produce an input on line 97 to full adder 92. In population count mode, bit "four" and bit "negative" of the population count are always at logic zero.

Full adder 92 adder sums the value on line 97, a sum output from a full adder from a cell immediately above (which is zero if there is no cell immediately above), and a carry-out of the cell to the upper right (which is zero if there is no cell to the upper right) to produce a sum bit on a line 106 and a carry-out bit on a line 105. The cells within multiplier core 83 sum up the partial products, and the sum and carry-out of the bottom cells of the array are the inputs to a final adder that produces the final result.

In population count mode, certain of the values in the cells are forced to logic zero. This is done by the use of an input 107 to multiplexor 91. When input 107 is asserted, output 96 of multiplexor 91 is forced to logic zero.

For a 9×9-bit multiplier, Table 11 below illustrates which cells have values which are forced to logic zero.

TABLE 11

| | | | | | | | | $X_8$ | $X_7$ | $X_6$ | $X_5$ | $X_4$ | $X_3$ | $X_2$ | $X_1$ | $X_0$ | |
|---|---|---|---|---|---|---|---|---|---|---|---|---|---|---|---|---|---|
| | | | | | | * | * | * | X | X | X | * | * | * | * | * | $E_0$ |
| | | | | * | * | * | * | * | X | X | X | * | * | * | | | $E_1$ |
| * | * | * | * | * | * | * | * | * | X | X | X | | | | | | $E_2$ |
| 0 | 0 | 0 | 0 | 0 | 0 | 0 | 0 | Z | Z | Z | Z | 0 | 0 | 0 | 0 | 0 | |

In Table 11 above, each "*" indicates a value forced to logic zero. In Table 11, $E_0$ is the population count value of the three least significant bits, $E_1$ is the population count value of the next three bits, and $E_2$ is the population count value of the three most significant bits. As seen from Table 11, the population count is simply a sub field of the final multiplier result. For additional explanation, an example of a computing population count is set out below for a 9-bit Booth-Encoded multiplier.

The population count is taken of the "Y" multiplier operand. For the present example, the "Y" operand is equal to 010 111 110 (population count=6).

The Y operand is encoded by modified Booth encoder 81 when in population count mode. Modified booth encoder 81 produces the following values on the output busses which form output lines 87 (note h equals 3), as shown in Table 12 below:

TABLE 12 zero[2:0] = 000   four[2:0] = 000 (always zeros for pop count)
one[2:0] = 100   neg.[2:0] = 000 (always zeros for pop count)
two[2:0] = 001
three[2:0] = 010

If there were no values forced to zero, partial products in multiplier core 53 would be as shown in Table 13 below:

TABLE 13

| | |
|---|---|
| 001001001 | $E_0$ = 1× multiple |
| 011011011 | $E_1$ = 3× multiple |
| 010010010 | $E_2$ = 2× multiple |

When values in selected logic cells are forced to zero, partial products in multiplier core 53 are as shown in Table 14 below:

TABLE 14

```
     0 0 1 0 0 0 0 0 0      E₀ = 1x multiple
     0 0 0 0 1 1 0 0 0      E₁ = 3x multiple
     0 0 0 0 0 0 0 1 0      E₂ = 2x multiple
─────────────────────────
  0 0 0 0 0 0 1 1 0 0 0 0 0 0 0 0
```

From the bits of the result, the population count is seen to be $0110_{base\ 2}$, that is equal to 6.

The principles demonstrated by the above example using a 9×9-bit multiplier can be extended to any size multiplier. The bit length of the operand on which a population count is taken is determined by the number of bits in the multiplier ("Y" operand). The present invention additionally applies for any radix encoding. For whatever number of bits which are encoded at a time (i.e., 3 bits for radix-8 encoding, 4 bits for radix-16 encoding, 2 bits for radix-4 encoding, and etc.), modified Booth encoder 81 functions as a population counter for that number of bits. The width of the column in the partial product array with partial products not forced to zero is equal to the number of bits for each multi-digit input to Booth-encoder 81. This column is used to calculate the population count. The least significant bit (LSB) of the column used to calculate the population count corresponds to the LSB of the bottom most partial product.

The constant used for the "X" multiplicand has the form 0 . . . 010 . . . 010 . . . 01. The total number of bits is equal to the number of bits in "X". The number of zeros between each one is determined by the radix encoding. For a radix-4 encoding, there is one zero between each one. For a radix-8 encoding, there are two zeros between each one. For a radix-16 encoding, there are three zeros between each one. And so on.

The foregoing discussion discloses and describes merely exemplary methods and embodiments of the present invention. As will be understood by those familiar with the art, the invention may be embodied in other specific forms without departing from the spirit or essential characteristics thereof. For example, the partial products might be generated with logic equivalents of a three input logic AND gate. Accordingly, the disclosure of the present invention is intended to be illustrative, but not limiting, of the scope of the invention, which is set forth in the following claims.

We claim:

1. A multiplier which also performs a population count comprising:

partial product generation means for generating partial products for multiplication, the partial product generation means including zeroing means for forcing a subset of the partial products to zero when performing a population count; and, partial product sum means, coupled to the partial product generation means, for summing the partial products generated by the partial product generation means to produce a result.

2. A multiplier as in claim 1 wherein the partial product means comprises a plurality of three-input logic AND gates arranged in rows, each row of logic AND gates used to multiply all bits of a first multiplicand by a single bit of a second multiplicand during multiplication.

3. A multiplier as in claim 2 wherein the zeroing means comprises a control input to each of the three-input logic AND gates.

4. A multiplier as in claim 2 wherein the partial product sum means comprises:

row reduction logic, the row reduction logic reducing the partial products generated by the partial product generation means into two rows of partial products; and, carry propagate addition logic which performs a carry propagate addition on the two rows of partial products to produce the result.

5. A multiplier as in claim 1 wherein the partial product sum means comprises:

row reduction logic, the row reduction logic reducing the partial products generated by the partial product generation means into two rows of partial products; and, carry propagate addition logic which performs a carry propagate addition on the two rows of partial products to produce the result.

6. A multiplier as in claim 1 wherein when a population count is to be performed:

a first value is input into the multiplier in place of a first multiplicand, the first value being an operand upon which the population count is to be performed;

a second value is input into the multiplier in place of a second multiplicand, each bit of the second value being at logic one; and, a portion of partial products in the partial product rows being forced to logic zero, so that only a single column is used to calculate the population count.

7. A multiplier as in claim 1 wherein the multiplier is a Booth-encoded multiplier.

8. A multiplier as in claim 7 wherein the partial product generation means includes a modified Booth encoder, the modified Booth encoder, when in a population count mode, produces an output which indicates for each multi-bit digit input, a population count for the multi-bit digit input.

9. A multiplier as in claim 8 wherein when in the population count mode, a portion of partial products in the partial product rows are forced to logic zero, except for a single column which is as many bits wide as a multi-bit digit.

10. A multiplier as in claim 8 wherein when in population count mode, a value used in place of a first multiplicand to the Booth-encoded multiplier has a form 0 . . . 010 . . . 010 . . . 01 where a number of "0"s between each "1" is determined by a radix encoding number used by the modified Booth encoder.

11. A method for using a multiplier to perform a population count comprising the steps of:

(a) inputting a first value to the multiplier in place of a first multiplicand, the first value being an operand upon which the population count is to be performed;

(b) inputting a second value to the multiplier in place of a second multiplicand, each bit of the second value being at logic one;

(c) forcing to logic zero a portion of partial products so that only a single column of partial products is used to calculate the population count; and, (d) summing the partial products to produce a result.

12. A method as in claim 11 wherein in step (c) partial products are forced to zero by placing a zero on a control input of three-input logic AND gate used to generate the partial product.

13. A method as in claim 11 wherein step (d) includes the following substeps:

(d.1) reducing the partial products into two rows of partial products; and, (d.2) performing a carry propagate addition on the two rows of partial products to produce the result.

14. A method for using a Booth-encoded multiplier to perform a population count comprising the steps of:

(a) inputting a first value to the multiplier in place of a first multiplicand, the first value being an operand upon which the population count is to be performed;

(b) encoding multi-bit digits of the first operand using a modified Booth-encoder, each multi-bit digit being encoded to a count value which equals a population count of the multi-bit digit;

(c) inputting a second value to the multiplier in place of a second multiplicand;

(d) forcing to logic zero a portion of partial products so that only a portion of partial products are used to calculate the population count; and, (e) summing the partial products to produce a result.

15. A method as in claim 14 wherein in step (d) partial products not forced to logic zero all reside in a column which is as many bits wide as a multi-bit digit.

* * * * *